Oct. 9, 1928.

W. M. TAYLOR 1,686,941

VEHICLE LEVELING MACHINE

Filed March 4, 1927     3 Sheets-Sheet 1

Inventor,
William M. Taylor,
By Minturn & Minturn
Attorneys.

Oct. 9, 1928.
W. M. TAYLOR
1,686,941
VEHICLE LEVELING MACHINE
Filed March 4, 1927  3 Sheets-Sheet 2
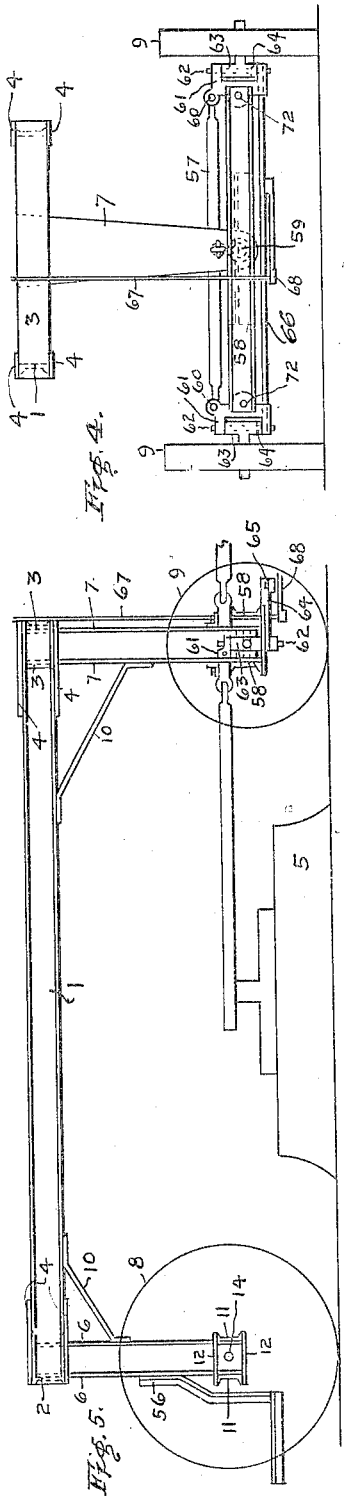
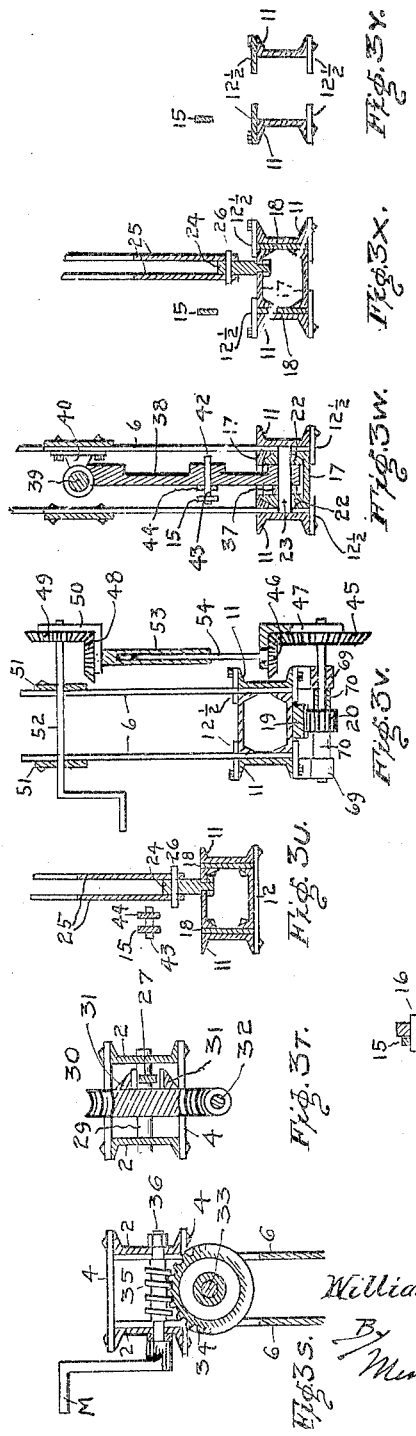
Inventor,
William M. Taylor,
By
Minturn & Minturn
Attorneys.

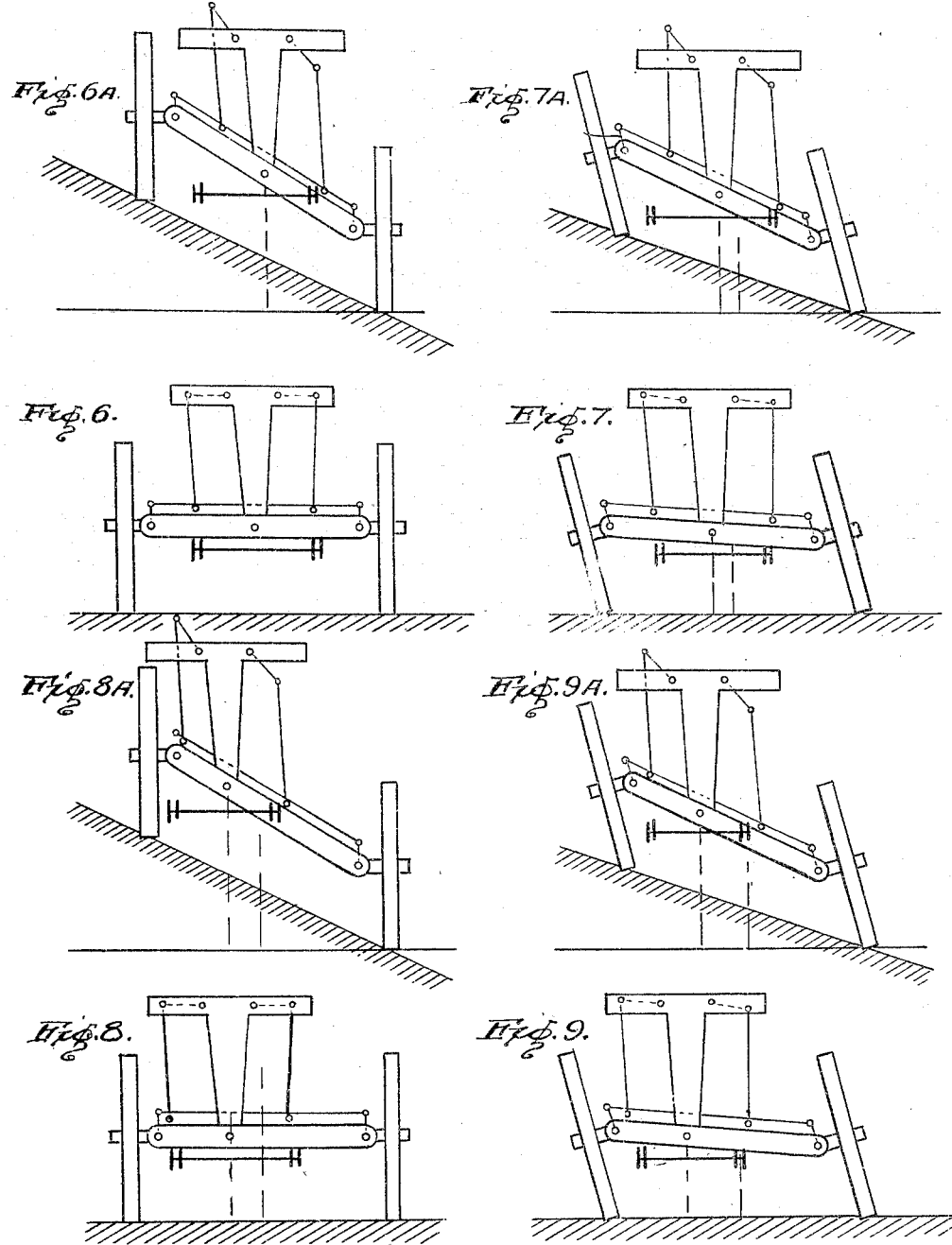

Patented Oct. 9, 1928.

1,686,941

UNITED STATES PATENT OFFICE.

WILLIAM M. TAYLOR, OF INDIANAPOLIS, INDIANA, ASSIGNOR TO MARY A. TAYLOR, OF INDIANAPOLIS, INDIANA.

VEHICLE LEVELING MACHINE.

Application filed March 4, 1927. Serial No. 172,649.

This invention relates to improvements in road machines comprising a body frame, four wheels on which the frame is mounted, and a scraper blade supported between the two pairs of front and rear wheels. The particular function of the road making machine described herein is to grade the surface of the road by means of a scraper blade and its particular use is to move dirt and other materials to accomplish this end.

When the machine is in its usual position at work there are two of the wheels (one forward and one back wheel) in the ditch and the other (forward and back) wheels are upon the road.

While this grading machine has four wheels like a wagon, the condition of its operation differs greatly from the operation of a wagon. A wagon carries its load on top of the bed and travels on a level. A road grader works with one side down in the drainage ditch, and moves its load sidewise and uphill.

When the machine is in operation the axles of the grader are inclined at a very considerable angle, sometimes as great as thirty or forty degrees with the horizontal and as a result of this inclined position of the axle, the machines as now built have very serious defects. With present machines the tilting of the axle means a corresponding tilting of the body frame, which throws the center of gravity of the machine toward the wheel on the low side. This adds seriously to the weight carried by the wheel in the ditch where weight is not wanted because this wheel is traveling in soft plowed ground and it takes an equal weight away from the wheel on the high side where weight is wanted because the upper wheel is traveling on the hard surface of the road.

Also with these machines as now built the platform upon which the operator stands to manipulate the machine inclines as the axle and the body frame inclines and this makes it difficult to control the machine properly due to the uncertain footing for the operator. Further than this, with present machines since the apparatus carrying the scraper blade and the means for controlling its operations, are attached to the machine body frame and since the angle of inclination of the machine body is the same as the angle of inclination of the axle from the horizontal, and varies with it, the control of the blade is irregular and uncertain and the stresses in the supporting beams of the machine body change as the angle of the axle changes.

The work of a grading machine as stated is moving its load sidewise and uphill. The load therefore is constantly tending to push the machine sidewise and downhill. If the wheels were fixed on a stiff axle like a wagon, the inclination of the axle would mean a corresponding inclination of the wheels and there would be nothing to resist this downward thrust of the load except the edge of the tire of the wheels.

Therefore a leaning wheel, which tilts to an angle from the axle is used in order that the face of the tire may press against the earth and thus give a rolling brace against the side thrust of the load, toward the downhill side. These leaning wheels are used in connection with machines now built but owing to the danger of the leaning body frame striking the tilting wheel the diameter of the wheels must be made small which means increasing the draft of the machine or else the bed frame must be made narrow which prevents the attachment of the scraper blade controls at a sufficient distance from the center of the blade for satisfactory operation or it may mean modification in both of these particulars.

An object of this invention is to provide means for leveling of the body frame of the grading machine so that no matter what the angle of inclination of the axle, by a single control the body frame and likewise the operator's platform may be kept level and the wheels kept vertical and at right angles to the body frame and at the same time, the center of gravity of the unit will always be directly above the midposition between the points of contact of the wheels upon the ground. By this means the wheels can be made as large in diameter as is desired without fear of them striking the body frame, and also the body frame can be made almost as wide as the distance between the wheels without fear of coming in contact with the wheels. On account of the center of gravity of the machine being always directly above the midposition between the points of contact of the wheels upon the ground, the weight on the high and the low wheel and consequently the pressure on the ground from these two wheels would always be equal no matter what the inclination of the axle. Also, the controls of the scraper blade are attached to a frame that is always horizontal and the stresses in the supporting beams will always be in the direction giving the greatest strength and rigidity.

A second object is to provide a means, by a second control for tilting the wheels to any desired angle in order to resist the side thrust of the load toward the downhill side and at the same time, in combination with the means set forth in the first object to keep the machine body and likewise the operator's platform constantly level no matter what may be the angle of the axle or the tilt of the wheels. Whatever may be the angle of the axle or the tilt of the wheels the center of gravity of the machine will always be in midposition or higher with reference to the points of contact of the wheels with the ground. That is to say, with the operation of the controls named in the first and second objects set forth herein, the downward pressure from the wheels on the high side will never be less than the downward pressure from the wheel on the low side and in nearly all operating conditions the downward pressure on the ground from the wheel on the high side will be greater than the downward pressure on the ground from the wheel on the low side. Under no condition will the pressure downward on the ground from the low side wheel be greater than the downward pressure on the ground from the high side wheel.

A third object is to provide a means operated by a third control, for shifting the mechanisms set forth in the first and second objects so that they will be moved longitudinally along the axle and uphill, for the purpose of still further moving the center of gravity toward the high side of the machine and thereby still further increasing the downward pressure of the high wheel and correspondingly decreasing the downward pressure of the low side wheel. This uphill sideshift of the machine body on the axle in combination with the devices set forth in the first and second objects named herein to maintain the machine body and likewise the operator's platform level, no matter what the inclination of the axle may be or the tilt of the wheels to give a rolling brace to the load. Whatever may be the angle of the axle, or the tilt of the wheels, or the shift of the machine body sidewise and uphill, the center of gravity of the machine will always be in midposition or higher with reference to the points of contact of the wheels with the ground. That is to say that with the operation of the three controls named, the downward pressure from the wheel on the high side will never be less than the downward pressure from the wheel on the low side and in practically all cases the downward pressure on the high side will be greater than the downward pressure from the wheel on the low side. Under no condition will the downward pressure from the low side wheel be greater than the downward pressure from the high side wheel.

A fourth object is to provide a means to give the proper tilt to the wheels to brace against the side pull of the load for any condition of load or kind or quantity of material, to provide a means for controlling the downward pressure of the wheels on the high and low side of the machine, to give the proper pressure for the best operation of the machine under all conditions of the ground over which the wheels have to travel, and all inclinations of the axle, and simultaneously with the above named means to provide means for always maintaining the body frame of the machine and likewise the platform on which the operator stands, always in a level position.

Other objects will appear in the course of the following description.

While the objects as stated have been set forth as applying to road graders, the need for a level bed when there are varying angles of the axle are needed for other service, this device may be used for such service. Therefore in my application, while it is set forth as applying specifically to road graders, where there is need for such a device this mechanism may be used for such service wherein the load must be carried level and the center of gravity of the load kept central or above the wheel base without regard to the angularity of the axle.

Further than this the mechanism set forth in connection with the objects named herein might not be necessary for all conditions of work.

For cases other than road graders wherein the load is carried on top of the bed and wherein the bed must be level, the center of gravity central and the wheels vertical, regardless of the angularity of the axle, the mechanism set forth in the first object named herein would be entirely sufficient without any of the others.

In cases, even with graders, the character of the road building material in a given locality might be such that satisfactory service might be had by the mechanism set forth in the first two objects and by so building the machine the cost of the machine would thereby be considerably lessened.

For specific services therefore, a machine can be built requiring the mechanism of only the first object set forth herein; for others the first and second only can be used and for still others the mechanism named in all three objects will be required. On this account, my application covers any of the above combinations and all of them, as the needs of the service requires but the first object is essential in all cases.

I now describe my invention, so that others skilled in the art to which it belongs may make and use the same, reference being made to the accompanying drawings in which similar numbers of reference refer to similar parts throughout, it being understood that changes can be made within the scope of what is claimed, without departing from the spirit of the invention.

In the drawings Fig. 1, is a rear elevation of the rear axle and Fig. 2, is a side elevation of the same axle. The rear axle carries the leveling mechanism, the front axle is a supporting member only, so far as the leveling mechanism is concerned. The front axle carries a mechanism similar to the rear axle for tilting the front wheels and for laterally shifting the front end of the bed of the machine lengthwise of the front axle. In addition the front axle carries the steering mechanism for the entire machine.

Figs. $3^u$, $3^v$, $3^w$, $3^x$, $3^y$, and $3^z$ give sections of the rear axle and Figs. $3^s$ and $3^t$ give sections of the back member of the bed frame at points indicated in Fig. 1, to show in detail the means employed in accomplishing the results set forth in this application.

Fig. 4, shows a general front elevation of the front axle and Fig. 5, shows the side elevation of the assembled machine.

Fig. 6, shows an outline of the normal machines with the axle horizontal and the wheels vertical. Fig. $6^a$ shows the outline of the machine with a leaning axle and having the bed leveled by control M as set forth in the first object named herein. The change from Fig. 6 to Fig. $6^a$ is made by the operation of control M. Fig. 7 shows an outline of the machine with the axle substantially level and the wheels tilted by control N. Fig. $7^a$ shows the outline of the machine with the tilting wheels and the leaning axle, the bed being leveled by the control M, the change from Fig. 7 to Fig. $7^a$ being made by the operation of control M. This shows the result of a combination of the first and second objects as set forth herein. The center of gravity of the machine has been moved toward the high side from the midpoint between the contact points of the two wheels on the ground by the distance between the two dotted lines on the figures. Fig. 8, shows the outline of the machine with the axle level and the bed shifted to the high side by the control P. In this process the wheels are maintained vertical by the operation of the control N either simultaneously or otherwies at the will of the operator as will be explained later. Fig. $8^a$ shows the outline of the machine with the bed shifted along the axle and the leaning axle, the change from Fig. 8 to Fig. $8^a$ being made by the operation of the control M. This shows the result of the combination of the three controls M, N, and P as set forth in the first, second and third objects named herein. The center of gravity of the machine has been raised from the midpoint between the contact points of the two wheels on the ground by the distance between the two dotted lines shown in the figures.

Fig. 9 shows the outline of the machine with the axle substantially level but with the bed shifted along the axle by the control P and the wheels tilted by the control N. The operator, in moving the control P to shift the bed lengthwise at the same time, and by the same movement likewise tilts the wheels. If the desired movement of the bed does not give the proper tilt to the wheels this tilt can be increased or decreased by the control N. Fig. $9^a$ shows the outline of the machine with the bed shifted along the axle, the wheels tilted and the axle in a leaning position, the change from Fig. 9 to Fig. $9^a$ being made by the operation of the control M. This shows the result of the three controls M, N, and P as set forth in the first, second and third objects named herein. The center of gravity of the machine has been raised from the midpoint between the contact points of the two wheels on the ground by the distance between the two dotted lines shown in the figures.

The reach beams 1 are connected together at their ends by duplicate cross channel beams at each end. These cross channel beams are numbered 2 on those over the rear axle and 3 on those over the front axle. These beams 1, 2 and 3 are tied together at the corners by the plates 4.

The controls for the scraper blade 5 by which it is raised and lowered, moved sidewise or rotated, are attached to the beam 1 and are not shown as they are not a part of this invention, although it is evident that a constantly level bed to which these controls are attached must be desirable for the satisfactory operation of these controls and for the satisfactory operation of the machine.

The machine body of which the beams 1 are the sides and the cross bars 2 and 3 are the ends, form the machine body frame which is supported on the axles by means of duplicate plates 6 at the rear end and 7 at the front end, these plates 6 being rigidly riveted to the cross beams 2 at the rear end and the plates 7 being rigidly riveted to the cross beams 3 at the front end.

These duplicate plates 6 and 7 are pivotally attached to the front and rear axles by means which will be described later and the ends of the axles are supported by the rear wheels 8 and the front wheels 9 the detail of which likewise will be described later. The inner front and rear plates 6 and 7 are braced to the reach bars 1 of the bed by the braces 10.

The rear axle consists of double channel bars 11 placed with their flanges to the outside and their plain sides to the center. These channels 11 are held in proper relation to each other by tie plates 12 riveted to the under sides of the channels at their ends. Additional tie plates may be used in practice or those illustrated considerably enlarged without interfering with the spirit of this application.

Near each end of the channels 11 is a bearing pin 13 extending through both channels as shown in Fig. 3$^z$, which bearing pin supports the angle arms 14 carrying the two wheels 8 as shown in Fig. 1. Each of the angle arms 14, carrying the wheels 8 has a vertical upwardly extending arm which vertical arms are connected together by the cross arms 15 by means of which the two wheels 8, through the arms 14, are always held parallel with each other, the connection between the arms 14 and 15 being made by the proof pins 16. Between the channel bars 11 is a sliding frame consisting of two channel beams 17, the upper of which has its flanges extending downwardly and the lower of which has its flanges extending upwardly so that the plain side of each channel is to the outside top and bottom. The width of the channels 17 of this inner frame is narrower than the distance between the channel bars 11 by slightly less than twice the thickness of the vertical supports 6 and they (the channels 17) are held in proper relation with each other, by four tie plates 18, of the same thickness as the supporting members 6. These tie pieces 18 are riveted to the ends of the flanges of the channels 17 by rivets countersunk on the outside so that the frame composed of the channels 17 and the tie pieces 18 will be of the same vertical height as the vertical height of the channels 11. This frame 17—18 is held from dropping below the channels 11 forming the axle by the lower stops 12½ riveted to the lower flanges of the channels 11, and it is held from lifting above the top of these channels by the upper stops 12½ which are bolted to the upper flanges of channel 11. These stops do not run continuously from one channel 11 to the other like the tie plates 12 room being left in the gap between the corresponding members 12½ on the upper side for the passage along the axle of the leveling mechanism and on the lower side for the passage of the rack operating the side shift of the frame 17—18. See Figs. 3$^x$ and 3$^v$.

A sufficient number of stops 12½ are used so that the frame 17—18 is in all positions held from dropping below or lifting above the channel bars 11 and at the same time free enough to easily move lengthwise of them. On the lower side of the box formed by the channels 17 and the tie plates 18 and running longitudinally of the box is bolted a rack 19 to the lower channel. Into this rack gears a pinion 20, carried by the shaft 21.

The shaft 21 is journaled in boxes 69 attached to the lower flanges of the channel beams 11, and the collars 70 prevent end motion of the shaft 21. This shaft 21 is keyed or otherwise fastened to the pinion 20 so that any rotation of the shaft 21 will likewise rotate the pinion 20 which in turn engages with the rack 19 producing motion in the box 17—18 lengthwise of the axle formed by the channel 11. See Fig. 3$^v$. The means for operating the shaft 21 will be described later.

Under certain conditions it may be more desirable to place this rack on the upper side instead of the lower side of the sliding box 17—18 and readjust the operating mechanism to suit and therefore the application is not limited to the particular apparatus described herein for moving the sliding member 17—18 longitudinally along the axle 11.

The duplicate plates 6 are flexibly attached to the box 17—18 after the manner shown in Fig. 3$^w$. Within the box 17—18 at a suitable point a support 22 for the bearing pin 23, is riveted to each of the channels 17 by means of countersunk rivets so that the rivets will not project beyond the top, bottom or sides of the channels 17 nor will they project beyond the inner surfaces of the supports 22. These supports 22 carry a pivot pin 23 the length of which is the distance between the channels 11 so that it will not prevent the free movement of the box 17—18 longitudinally of the axle 11. See Fig. 3$^w$. The upright plates 6 by this means can rotate about the pin 23 to accommodate any inclination of the axle in its relation to the vertical plates 6 and at the same time any movement of the box 17—18 lengthwise of the axle, will move the pivot 23 a greater or less distance from one or the other of the wheels 8.

Near each end of the sliding box 17—18 in the top channel 17 are upwardly extending supporting posts 24, carried by the box 17—18, for operating the leveling control mechanism. These supporting posts 24 are bolted at their lower ends to the upper channel 17 and move with it. In simplified cases these supporting posts 24 are bolted directly to cross-pieces attached to the axle 11, not shown. These supporting posts 24 have a horizontal bearing hole in each near the top for the pivotal attachment of additional mechanism. By means of pivot pins 26, these supporting posts 24 at their upper ends have duplicate control arms 25 attached to them the control arms moving pivotally around the pins 26. At the upper ends of these duplicate vertical control arms 25 they are pivotally connected to the horizontal control arms 27 by pins 28 which extend through the duplicate vertical control arms 25 and the horizontal control arms 27 leaving both horizontal and vertical arms free to move up and down between the duplicate channels 2 which form the back end of the bed frame. The ends of the arms 27 toward the center of the machine are pivoted around the cross shafts 29, which extend through the cross channels 2 from side to side. Upon these shafts 29 are also pivoted the worm wheels 30 held in proper side position, together with the arm 27 by means of collars. Near the rim of each of the worm wheels 30 is fastened or cast lugs 31 between which the arm 27 rests so that any motion of the worm wheel 30 around its axis, is transmitted to the arm 27. Any rotation of the wheel 30 would therefore cause a corresponding motion, up or down, of the pin 28. Since the pin 28 is limited in its movements by the arms 25 and 27 and since each of the worm wheels 30 is attached to the bed frame channels 2 by means to be described, any rotation of the worm wheel 30 would cause a rotation of the channels 2 (and likewise the plates 6 which are rigidly attached to them) around the pivot 23 in the axle.

In order to function properly the two worm wheels 30 must each rotate in the same direction and any means for accomplishing this will cause the mechanism to function properly. Therefore while other methods than those shown herein may be employed without affecting the validity of this application the one shown herein is as follows. The worm pinions 32, threaded to screw in the same direction, engage with the worm wheels 30. These pinions 32 are caried by a shaft 33 which shaft 33 is supported by bearings 71 carried within the vertical plates 6 and bolted thereto. This shaft 33, in addition to the pinions 32 also carries a worm wheel 34, which worm wheel 34, in turn is engaged at its top with a worm pinion 35 carried by a shaft 36, said shaft 36 being supported by bearings in holes through the channels 2 and the ends of the vertical plates 6. In this arrangement of gearing a section is cut out of the upper portion of the plates 6 so that the worm wheel 34 may operate without coming in contact with these plates. See Fig. 3ˢ. Shaft 36 extends a sufficient distance beyond the flanges of the channels 2 so that an attached crank M may be turned a complete circle. The rotation of the crank M will put in motion the chain of gearing just described and will cause the rotation of the vertical plates 6 around the pivot 23 thereby giving corresponding motion to the bed frame of the machine which is represented on the drawings by the channels 2 they being rigidly attached to the vertical plates 6. In visualizing from Fig. 1, the action caused by the rotation of the crank M, it would appear that this rotation would cause the rotating of the cross members 2 and the vertical members 6 but with the machine in actual operation it is the axle which tilts and the mechanism described keeps the members 2 horizontal and the vertical members 6 vertical regardless of the tilt of the axle. The tilting of the wheels is accomplished by the following mechanism.

In the top channel 17 at a point directly above the pivot 23, a rectangular hole is cut through the channel 17 of sufficient size to admit the lower portion of a segment arm 38, said segment arm having a bearing at its lower end fitting upon and rotating about the proof pin 23, the size of the hole in the channel 17, to be ample to allow such motion of the segment arm 38 around the pin 23 as is necessary to accomplish the objects described herein. A collar 37 prevents any side play between the lower end of the segment arm and the support 22 for pivot pin 23. See Fig. 3ʷ. This segment arm 38 has worm gear teeth on its upper face as shown in Fig. 1, and engaging with these teeth is a worm pinion 39, supported in boxes 40 bolted to the vertical plate 6, and keyed to shaft 41. The pinion 39 extends between the boxes 40 so that there will be no end motion of the shaft 41. The shaft 41 is bent or otherwise made so that it forms the crank N. The rotation of the crank N will rotate the pinion 39 thereby moving the segment wheel 38 to the right or left around the pivot 23. The segment wheel 38 is made with a cross bar at such height that its center will come at the same height above the axle channel bars 11 as the cross bar 15 when the axle is level and the wheels vertical. On the side of the segment wheel 38 toward the operator is a pin 42, (see Fig. 3ʷ) and likewise toward the left end of the crossbar 15 is a bearing pivot 43 extending away from the operator (see Fig. 3ᵘ). A connecting link or arm 44 connects the two pins 42 and 43. From this construction is will be seen that a side motion of the segment wheel 38 produced by rotating the crank N, will rock the cross arm 15 sidewise, by means of the link 44 thereby correspondingly rocking the angle arms 14, carrying the wheels and thereby producing a tilting of the wheels. It will also be seen that, without any movement of the crank N the sliding of the movable box 17—18 along the axle will likewise move the cross arm 15 to tilt the wheels since the segment wheel 38 moves as its own pivot 23 moves along the axle so long as the realtionship of the segment wheel 38 remains fixed with relation to the vertical plates 6.

The vertical plates 6 and the vertical control arms 25 move as a unit using the sliding box 17—18 as a base and it is therefore obvious that a side movement of this base 17—18 along the axle moves the bar 15 correspondingly thereby tilting the wheels. If the proper side shift of the box 17—18 to give the right relative pressure between the high and low wheels for a given condition does not give a proper tilt to the wheels the rotation of the crank N can then alter the relationship between the segment wheel 38 and the vertical plates 6 and make such tilt to the wheels as is necessary to give the proper rolling brace for the load, thereby adjusting the tilt of the wheels and their relative pressure upon the ground as is necessary for any given condition.

Further than this the centers of the bearings 13 and 16 of the angle arm 14 supporting the wheels and the centers of the pivot 23 and of the pivot 42 of the segment wheel 38, when the segment wheel is in mid-position with reference to the vertical plates 6, form a parallelogram whose opposite sides will always be parallel so long as the segment wheel 38 remains central with the vertical plates 6. With the segment wheel 38 in this relation, the crank M when rotated in order to maintain the bed of the machine level will always maintain the wheels vertical and at right angles to the bed. This relation will continue regardless of what the inclination of the axle may be unless and until the inclination of the wheels is changed by the operation of one of the other controls. If this parallelogram is disturbed by the operation of one of the other controls and the wheels are tilted when the axle and also the bed are both level, then thereafter, if the axle is inclined and the bed is kept level by the control M, after the wheels are tilted, the angle of the wheels to the horizontal will always remain the same regardless of the tilt of the axle.

The means by which the shaft 21 is operated is shown in Fig. 3$^v$. A bevel gear 45 is held in mesh with a bevel pinion 46 by an angle piece 47. Above this bevel gear and bevel pinion is a duplicate gear 49 and pinion 48 and a similar angle piece 50. Two plate arms 51 extending across the machine are riveted to the front and back vertical arms 6 and through bearings in these arms is inserted a cross shaft 52 which is attached to bevel gear 49 in the rear and in front terminates in crank P. Pinion 48 gears with the bevel wheel 49 and is held in contact with it by the angle piece 50. Bevel pinion 46 is connected to bevel pinion 48 by two shafts 53 and 54 the one sliding within the other. Shaft 54 is round where it passes through pinion 46 and the angle piece 47 but above this it is square. Shaft 53 is round where it passes through pinion 48 and angle piece 50, below this it can be of any external shape but it has a square hole running lengthwise of it. The square hole in 53 makes a sliding fit with the square rod 54 so that the two will rotate together even though the centers of the shafts with which they connect may vary in their distance apart. This method transmits motion from the crank P to the shaft 21 regardless of the location of the box 17—18 upon the axle of the machine.

The platform for the operator is supported by one of the vertical plates 6 by means of the bent T bars 56. These T bars 56 are riveted to the vertical plates 6 and the vertical plates 6 are riveted to the cross channels 2 forming the front of the bed frame. Therefore the platform 55 is always parallel with the channel 2. When one is level the other is level. Figs. 1 and 2 show these T bars 56 attached to that plate 6 which is located nearest to the operator. With other operating mechanism there might be no obstacle to attaching these bars to the vertical plate 6 farthest from the operator or to the beams 1 extended, not shown, without destroying the intent of this application. As has already been stated herein the leveling device for the body frame of the machine is controlled by the mechanism carried by the rear axle. So far as the tilt of the front axle is concerned the front axle is uncontrolled and only acts as a supporting member. So far as the tilt of the axle goes the front axle follows whatever inclination or change of inclination which the ground gives it without affecting the level of the machine body, its only function so far as the angularity of the axle is concerned being to support the front end of the machine.

In order however that the machine body may be in proper alignment in its operation and the proper pressures given to the high and low wheels it is necessary that the devices described herein for shifting the machine body toward the high side of the machine be used on the front axle as well as on the rear.

It is likewise necessary that the front wheels should tilt as well as the rear wheels so that the front wheels may be provided with means for giving the same rolling brace against the load as the rear wheels.

The mechanism necessary for shifting the point of support for the bed on the front axle, that is, by the use of a box similar to box 17—18 on the rear axle is also used on the front axle and likewise the device for tilting the wheels of the front axle by means of a segment wheel device similar to 38 on the rear axle is also used on the front axle and their description need not be repeated. The controls for these devices are however carried to the rear as will be mentioned later so that the operator can control them from his place on the rear platform. With the bed maintained level by the device carried by the rear axle, the centers of gravity on the front axle will be kept in the same relationship to the point of contact of the wheels on the ground, as on the rear wheels although the leveling mechanism is carried only by the rear wheels and the objects of this invention are carried out on the front axle as well as on the rear axle although the front axle actually carries no leveling device.

Fig. 4, shows the front axle in outline. The vertical plates 7 of this figure rest upon a supplemental box within the axle as is already described as box 17—18 for the rear axle and this supplemental box is operated longitudinally of the axle by a shaft corresponding to shaft 21 of the rear axle with its pinion and rack connection to box 17—18. In the case of the front axle however the vertical shafts corresponding to shafts 53 and 54 of the rear axle are carried up to the body frame of the machine and from there, through suitable rods, joints and gears, the control is carried to the rear of the bed frame so that the box in the front axle may be conveniently handled by the operator standing on the platform at the rear of the machine. Likewise between the vertical plates 7 are carried boxes for the support of a shaft similar to shaft 41 on the rear axle, carrying a worm pinion similar to pinion 39 of the rear axle and gearing into a segment wheel similar to segment wheel 38 of the rear axle and pivoted on a pin similar to pin 23 on the rear axle. By a connecting link similar to link 44 of the rear axle this segment gear between the upright plates 7 is attached to the cross arm 57 of Fig. 4. From the description given in connection with the rear axle it will be seen that this cross arm 57, will tilt the front wheels either by means of the segment gear of the front axle (corresponding to segment gear 38 of the rear axle) or by means of the shifting of the box (corresponding to box 17—18 of the rear axle) along the axle and will respond to the same adjustments of the tilt as are described for the rear axle. The control for the segment wheel is through the shaft on the front axle corresponding with shaft 41 on the rear axle. The operation of this control shaft on the front axle is made from the rear platform by connecting this shaft to the rear by means of rods, gears, universal joints or telescoping members as they may be needed to give the operator on the rear platform control of the shaft on the front axle which corresponds to shaft 41 on the rear.

The method of steering the machine as given may be modified or changed to other means without affecting the claims named herein this plan being given as one which will give operatively satisfactory results.

In Figs. 4 and 5 the front axle channels 58 are pivoted around the horizontal pivot 59 (which corresponds to pivot 23 of the rear axle) and the ends of the axle formed by these channels 58 can move freely up and down around the horizontal pivot 59. The front axle channels 58 cannot however rotate about a vertical axis to steer the machine and therefore this steering is accomplished in the following way:

The cross arm 57 at its ends is connected to a carrying arm 61 by the horizontal pivots 60. In turn this carrying arm 61 is pivoted to the front axle 58 by the horizontal pivots 72 extending through from side to side of the channel bars 58. This carrying arm 61 is made in the form of a fork with lugs at the top and bottom. Into the space between the two lugs in carrying arm 61 is pivoted an angle arm 63 carrying the front wheels 9. The angle arm 63 is pivotally connected to the upper and lower lugs of the carrying arm 61 by the vertical pin 62. To the bottom of the angle arm 63 and extending in a forward direction is the steering arm 64 rigidly attached to the angle arm 63 so that any motion toward the side of the machine by the steering arm 64 will rotate the wheel 9 on the vertical axis 62 and when the steering means for the two front wheels are connected so that they operate in unison and will properly steer the machine. The forward arms 64 are connected by a ball and socket joint 65 with a cross arm 66. By means of a vertical rod 67, extending to the top of the machine body with worm and pinion connection at its upper end to a rod extending back to within easy reach of the operator's platform and at the lower end of the rod 67 a crank arm 68 fastened to it, this crank arm 68 at its forward end being connected by a link to the cross arm 66, and the rocking of the crank arm 68 around the axis of the rod 67 the cross arm 66 will be moved laterally of the machine thereby steering the front wheels after the manner of the steering of an automobile.

By this means the front wheels may both be tilted and steered, the tilting and steering being each accomplished by a separate means and each operated independent of the other from the platform at the rear of the machine.

Referring to the outline diagrams Fig. 6 to Fig. 9a inclusive the operator's platform is shown in each diagram and is marked with the letter H at each end. In the following references to these diagrams the cranks M, N and P mentioned are those which are so marked in Figs. 1 and 2.

Fig. 6, shows the machine in normal position.

Fig. 6a, shows the result on Fig. 6 of operating control M. The bed is made and maintained level and the wheels maintained vertical regardless of the angle of the axle. The bed and the wheels are always at right angles to each other and no control other than control M is used.

Fig. 7, shows the result on Fig. 6 of operating control N which tilts the wheels, always maintaining them parallel to each other regardless of the amount of tilt, and also, a slight movement of control M to level the bed to correct the slight inclination of the axle due to the tilt of the wheels.

Fig. 7a, shows the result on Fig. 6 of operating controls M and N. The wheels are tilted by the control N, and the bed is made and maintained level and the wheels maintained at the same angle of tilt to the horizontal as in Fig. 7 by the control M.

Figure 1:
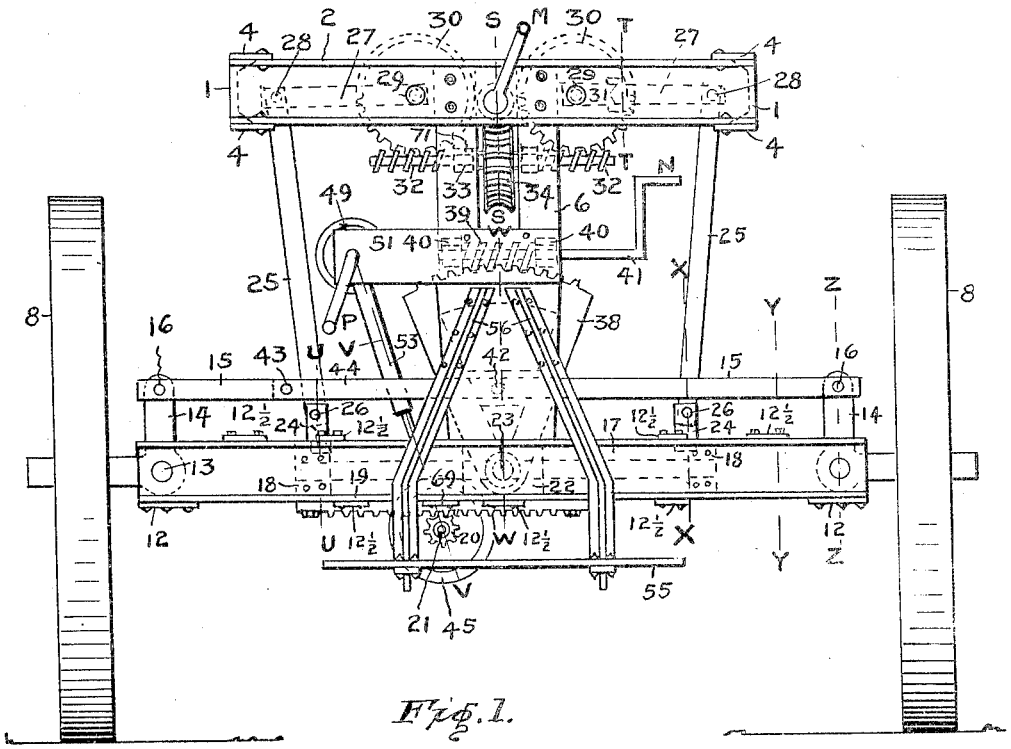
Figure 2:
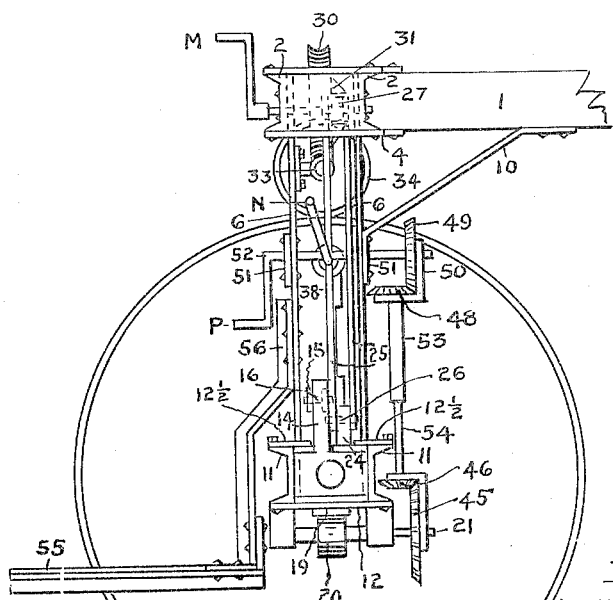

Fig. 8, shows the result on Fig. 6 of operating controls N and P. The side shifting of the box axle due to the operation of the control P would tilt the wheels if not neutralized by another control. To avoid this and maintain the wheels vertical, control N is used for giving an equal and opposite tilt to the wheels and thereby neutralize the tilting action of the control P.

Fig. 8ª, shows the result on Fig. 6, of operating all three controls M, N and P; it is the result also of the operation of control M on Figure 8. In it the bed is leveled and maintained vertical regardless of the angle of the axle. So long as no other control is used on Fig. 8 the bed and the wheels will always be at right angles to each other.

Fig. 9, shows the result on Fig. 6 of operating all three controls, first the side movement by control P which not only moves the the box axle but tilts the wheels as well, second the use of control N to correct the tilt produced by control P if such correction is necessary and third the slight use of the control M to correct the small inclination of the axle due to the tilt of the wheels.

Fig. 9ª, shows the result on Fig. 6 of operating all three controls M, N and P, it is the result also of the operation of control M on Figure 9. The bed is made and maintained at the same angle of tilt to the horizontal by the control M as in Fig. 9.

Each of these controls M, N and P can be operated separately or all simultaneously as may be required by the conditions of service.

Having thus described my invention, what I claim as new and desire to secure by Letters Patent, is—

1. A body frame and an axle mounted on wheels, in combination with two arms rigidly attached to the body frame and hinged to the axle and means for leveling the body frame when the axle is inclined to the horizontal.

2. A body frame and an axle mounted on wheels, in combination with two arms rigidly attached to the body frame and hinged to the axle and means for so leveling the body frame when the axle is at an angle to the horizontal that under all conditions of angularity of the axle the downward pressure on the wheel on the high side caused by said angularity will be as great as the pressure on the wheel on the low side.

3. A body frame, an axle and wheels on which the axle is mounted in combination with two downwardly extending arms rigidly attached to the body frame and pivotally attached to the axle, a shaft forming the pivot between the axle and the downwardly extending arms extending longitudinally of the body frame, two control members one on each side of the arms pivotally attached to the axle at an end of each and at the other end of each pivotally connected to the outside ends of two horizontal control members, said horizontal control members having their other ends pivoted to shafts supported longitudinally by the rear member of the body frame, said shafts being rigidly held, and means for moving the horizontal control members on the last named shafts to level the body frame and maintain the wheels at right angles to the body frame regardless of the angularity of the axle and without changing the center of gravity of the body from a vertical line midway of the planes of the wheels.

4. A body frame, an axle and wheels on which the axle is mounted, in combination with two downwardly extending arms rigidly attached to the body frame and pivotally attached to the axle, means for tilting the wheels to brace the machine against side thrust of the load, means for maintaining the body frame level regardless of the inclination of the axle and said wheel tilting means maintaining the same tilt with reference to the body frame regardless of the angularity of the wheels and said leveling means maintaining the center of gravity of the machine so that at all angles of the axle the downward pressure on the ground from the high-side wheel will be at least as great as the downward pressure on the ground from the low-side wheel.

5. A body frame, an axle, wheels on which the axle is mounted, two downwardly extending arms rigidly attached to the body frame, a base slidable longitudinally of the axle, said arms being pivotally attached to the base, means to move said base longitudinally of the axle, means for maintaining the body frame level regardless of the inclination of the axle or of the amount of shift of the base while also maintaining the center of gravity of the machine such as to exert at least as great a downward pressure on the wheel on the high side as is exerted on the wheel on the low side of the machine.

6. A body frame, an axle, wheels on which the axle is mounted, two downwardly extending arms rigidly attached to the body frame, a base slidable longitudinally of the axle, said arms being pivotally attached to the base, means to move said base longitudinally of the axle, two control members for leveling the body frame, one on either side of the downwardly extending arms, pivotally attached at their lower ends to the same base as the downwardly extending arms whereby these arms and the vertical control members may be simultaneously moved longitudinally of the axle toward the high side of the machine to bring them as a unit nearer to the high side wheel, and means to move said base longitudinally of the axle, in combination with means for maintaining the body frame level regardless of the inclination of the axle and at the same time maintaining the center of gravity of the machine at a point securing at least as great a downward pressure on the wheel on the high side as on the wheel on the low side of the machine.

7. A body frame, an axle, wheels on which the axle is mounted, two downwardly extending arms rigidly attached to the body frame, a base slidable longitudinally of the axle, said arms being pivotally attached to the base, approximately vertical control members one on either side of the downwardly extending arms pivotally attached to said base whereby said arms and control members are simultaneously movable as a unit longitudinally of the axle, a shaft supported by the axle, extending longitudinally of the machine body for moving the base along the axle, two horizontal control members each having an end pivoted on a shaft supported longitudinally by the rear member of the body frame, said horizontal control members having their other ends pivotally connected to the respective upper ends of the vertical control members, means for swinging the horizontal control members around the last named shafts, means for moving the slidable base longitudinally of the axle, in combination with means for maintaining the body frame of the machine level regardless of the inclination of the axle and the center of gravity of the machine such that the downward pressure on the wheel on the high side of the machine will be at least as great as the downward pressure on the wheel on the low side.

8. A body frame, an axle, wheels in which the axle is mounted, a base slidable longitudinally of the axle, two downwardly extending arms pivotally secured at their lower ends to the base means for tilting the wheels comprising a segment wheel rotating about the same pivot which pivotally secures the arms, a worm pinion gearing into the segment wheel, a shaft carrying the worm pinion held in boxes on the arms parallel with the machine body, means for rotating the shaft in combination with means for maintaining the body frame of the machine level regardless of the inclination of the axle and at the same time maintain the center of gravity of the machine such as to give at least as great downward pressure on the wheel on the high side as on the wheel on the low side.

9. A body frame, an axle, wheels in which the axle is mounted, a base slidable longitudinally of the axle, two downwardly extending arms pivotally connected at their lower ends to the base, approximately vertical control members pivoted at their lower ends to the base, shafts supported longitudinally of and by the machine body, horizontal control members pivoted at an end of each on the respective shafts and pivoted at their other ends to the vertical control members, worm wheels on the shafts having means to engage the horizontal control members to swing the latter by rotating the shafts, worm pinions supported by the downwardly extending arms, a worm gear mounted on the pivot of the downwardly extending arms, a worm pinion engaging this worm gear, a shaft on which the worm pinion is mounted and a crank on the last shaft.

10. A body frame, an axle, wheels in which the axle is mounted, a base slidable longitudinally of the axle, body supporting members pivotally attached to the base, means for leveling the body frame regardless of the inclination of the axle, and means for moving the body frame, the base, the body supporting members and the leveling means as a unit, longitudinally of the axle, to change the center gravity of the unit relative to the wheel supports.

11. A body frame, an axle, wheels in which the axle is mounted, body supporting members attached to the frame, pivotal means connecting the lower ends of the body supporting members with the axle, wheel tilting means pivoted on the last pivotal means, and means for moving the body frame, body frame supporting members and tilting means as a unit longitudinally of the axle to change the center of gravity of the unit relative to the wheel supports.

12. A body frame, an axle, wheels in which the axle is mounted, body supporting members attached to the frame, pivotal means connecting the lower ends of the body supporting members with the axle, wheel tilting means, means for leveling the body frame regardless of the inclination of the axle, and means for moving the body frame, body frame supporting members, wheel tilting means and leveling means as a unit longitudinally of the axle to change the center of gravity of the unit relative to the wheel supports.

13. A body frame, an axle, wheels in which the axle is mounted, body supporting arms attached to the frame, pivotal means connecting the lower ends of the body supporting arms with the axle, wheel tilting means pivoted on the same pivot as the body supporting arms, means for controlling the tilting comprising a shaft carried by the body supporting arms, a worm pinion on said shaft and a rack segment concentric with the pivot for the body supporting arms, means for leveling the body frame, and means for moving the body frame its supporting mechanism its leveling mechanism and said wheel tilting means as a unit longitudinally of the axle without disturbing their adjustments or interfering with their operations and for the purpose of changing the center of gravity of the unit relative to the wheel supports.

14. A body frame, an axle, bell crank spindles pivoted to the axle ends, wheels mounted on the spindles, a pair of arms attached to the frame, means pivotally connecting the lower ends of the arms with the axle, a segment rack concentric with the pivot of the arms, a cross arm connecting the bell cranks, a pitman connecting the web of the segment with the cross arm, and means attached to the frame supporting arms for moving the segment rack laterally and thereby acting through the pitman to actuate the cross arm longitudinally and tilt the wheels.

15. A body frame, an axle, bell crank spindles pivoted to the axle ends, wheels mounted on the spindles, a pair of arms attached to the frame, means pivotally connecting the lower ends of the arms with the axle, a segment rack concentric with the pivot of the arms, a cross arm connecting the bell cranks, a pitman connecting the web of the segment with the cross arm, and means attached to the frame supporting arms for moving the segment rack laterally and thereby acting through the pitman to actuate the cross arm longitudinally and tilt the wheels, in combination with means for leveling the body frame.

16. A body frame, an axle, bell crank spindles pivoted to the axle ends, wheels mounted on the spindles, a pair of arms attached to the frame, means pivotally connecting the lower ends of the arms with the axle, a segment rack concentric with the pivot of the arms, a cross arm connecting the bell cranks, a pitman connecting the web of the segment with the cross arm, and means attached to the frame supporting arms for moving the segment to actuate the cross arm longitudinally and tilt the wheels, in combination with means for leveling the body frame, and means for shifting the center of gravity of the body frame wheel tilting means and leveling means as a unit longitudinally of the axle.

17. A body frame, an axle, wheels on which the axle is mounted, downwardly extending arms attached to the body frame, a base slidable longitudinally of the axle, said arms being pivotally attached to the base, a rack fixed to the base and projecting therebeyond in both directions, a shaft journaled from the axle at or near the mid length of the axle, a pinion on the shaft meshing with the rack and means comprising gears and telescoping rods for rotating the pinion from a remote position of an operator, in combination with means for leveling the body frame under all angles of the axle and wheels.

18. A body frame, an axle, bell crank spindles pivoted to the ends of the axle, wheels mounted on the spindles, a bar connecting the bell cranks, downwardly extending members rigidly attached to the body frame, a base slidable longitudinally of the axle, said downwardly extending members pivotally attached to base, a pair of approximately vertical control members one on either side of the downwardly extending members pivoted at their lower ends to the base, a segment rack pivoted to the same pivot as the downwardly extending members, a pitman connecting the web of the segment rack with the bar connecting the bell crank spindles, means for moving the base longitudinally of the axle and means for simultaneously operating the cross arm for tilting the wheels whereby the tilting of the wheels from moving the base may be corrected by an opposite movement of the cross arm and wheels, in combination with means for leveling the body frame regardless of the tilt of the wheels or shift of the base and thereby maintaining the center of gravity where the downward pressure of the wheels on the high side will equal or exceed the pressure of the wheels on the low side.

19. A body frame, an axle, wheels mounted on the axle, a base slidable on the axle in either direction from a mid position, supporting members depending from the body frame and pivotally attached at their lower ends to the base, in combination with means for leveling the body frame at all angular positions of the axle whether the high end be on the right side or on the left side of the machine, and means for shifting the center of gravity of the body frame unit laterally of the machine whereby the pressure from the wheel on the high side, will equal or exceed the pressure from the wheel on the low side.

20. A body frame, an axle, wheels mounted on the axle, a base slidable on the axle, a pair of downwardly extending arms rigidly attached to the body frame at their upper ends and pivotally attached at their lower ends to the base, two approximately vertical control members for leveling the body frame located one on either side of the downwardly extending arms pivotally attached at their lower ends, a segment rack pivoted at its center to the same pivot as the downwardly extending arms, said downwardly extending arms, the vertical control members and the segment rack being pivoted to the base for movement with the body frame as a unit longitudinally of the axle, in combination with means for leveling the bed of the machine regardless of the angularity of the axle or tilt of the wheels, and means for maintaining the center of gravity of said unit at a point where the downward pressure of the wheel on the high side will equal or exceed the downward pressure of the wheel on the low side.

21. A body frame, two downwardly extending arm supports, an axle, wheels at its ends, a base sliding longitudinally of the axle, a pivot connecting the base with the downwardly extending arm supports, a segment wheel operated about the same pivot as the downwardly extending arm supports and moved about said said pivot by a worm pinion, a segment wheel, a worm pinion carried on said arm supports to change the relationship of the axes of the downwardly extending arm supports by cooperation with the segment wheel, and means for maintaining the body frame level, in combination with means for maintaining the tilt of the wheels at all times the same with reference to the body frames so long as there is no change in the relative positions of the axis of the downwardly extending arm supports and the axis of the segment wheel and also regardless of the angularity of the axle or the amount of side shift of the base toward the high side along the axle and means to maintain the center of gravity of the machine at a place where the downward pressure on the ground from the high wheel will always be equal to or greater than the downward pressure on the ground from the wheel on the low side.

22. A body frame, two downwardly extending arm supports, an axle, wheels at its ends, a base sliding longitudinally of the axle, a pivot connecting the base with the downwardly extending arm supports, a segment wheel operating about the same pivot as the downwardly extending arm supports, a worm pinion carried by said arm supports, said segment wheel moved about said pivot by the worm pinion and means for maintaining the body frame level regardless of the angularity of the axle, in combination with means for shifting the body frame longitudinally along the axle toward the high wheel, and means for tilting the wheels to give a rolling brace to the machine against the load and at the same time with the machine bed level keeping the center of gravity on the high side so that the downward pressure on the high wheel will always be equal to or greater than the downward pressure on the low wheel.

23. A body frame, two downwardly extending arm supports, an axle, wheels at its ends, a base sliding longitudinally of the axle, a pivot connecting the base with the downwardly extending arms and means for shifting the body frame longitudinally along the axle in order to shift the center of gravity of the machine so that the downward pressure from the high side wheel may be made any predetermined amount more than the downward pressure from the low side wheel, in combination with means for leveling the machine and maintaining it level regardless of the angle of inclination of the axle.

24. A body frame, two downwardly extending arm supports, an axle, wheels at its ends, a base sliding longitudinally of the axle, a pivot connecting the downwardly extending arm supports with the axle or sliding base, a segment rack rocking about the same pivot as the downwardly extending arms said segment rack being rocked about the pivot by a worm pinion, said worm pinion carried by said arm supports and means for tilting the wheels of the machine so that it will brace the wheels against the side pull of the load at any predetermined tilt, in combination with means for leveling the machine body and maintaining it level and at the same time with the machine bed level, means whereby the center of gravity of the machine will never be shifted to a point where the downward pressure of the wheel on the low side will exceed the downward pressure of the wheel on the high side.

25. A body frame, two downwardly extending arm supports, an axle, wheels at its ends, a base sliding longitudinally of the axle, a pivot connecting the downwardly extending arm supports with the sliding base, a segment rack rocking about the same pivot as the downwardly extending arms said segment rack being rockable about the pivot by a worm pinion, said worm pinion carried by said arms, and means for shifting the body frame longitudinally along the axle, to shift the center of gravity of the machine bed to any predetermined point, and means for tilting the wheels of the machine so that they will give the machine a brace against the side pull of the load at any predetermined tilt, in combination with means for leveling the machine body and maintaining it level regardless of the inclination of the axle and at the same time with the machine bed level, means whereby the center of gravity of the machine will never be shifted to a point where the downward pressure of the wheel on the low side will be greater than the downward pressure of the wheel on the high side of the machine.

In testimony whereof I affix my signature.

WILLIAM M. TAYLOR.